March 26, 1963

J. A. PETERSON ETAL 3,082,630

CONTROL APPARATUS

Filed Dec. 8, 1958

INVENTORS.
JACK A. PETERSON
HILLARD JOHN WAGNER

BY

ATTORNEY

March 26, 1963 J. A. PETERSON ETAL 3,082,630
CONTROL APPARATUS
Filed Dec. 8, 1958 3 Sheets-Sheet 2
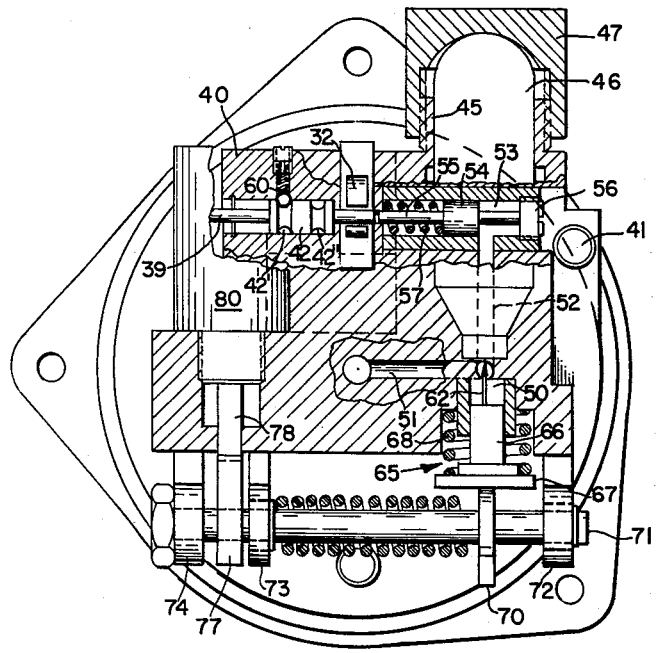
FIG 5
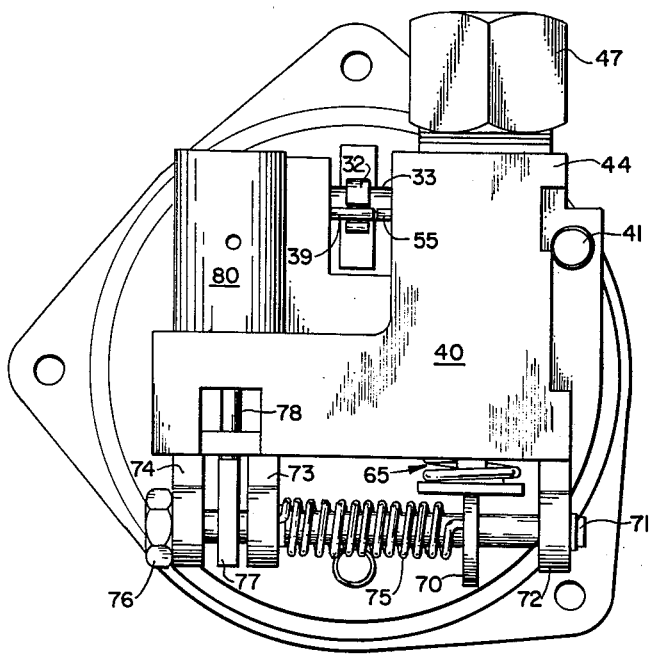
FIG 2
INVENTORS
JACK A. PETERSON
HILLARD JOHN WAGNER
BY
ATTORNEY March 26, 1963  J. A. PETERSON ETAL  3,082,630
CONTROL APPARATUS
Filed Dec. 8, 1958  3 Sheets-Sheet 3

INVENTORS
JACK A. PETERSON
HILLARD JOHN WAGNER
BY Roger W. Jensen
ATTORNEY

United States Patent Office 3,082,630
Patented Mar. 26, 1963

3,082,630
CONTROL APPARATUS
Jack A. Peterson, Morningside, and Hillard John Wagner, Roseville, Minn., assignors to Minneapolis-Honeywell Regulator Company, Minneapolis, Minn., a corporation of Delaware
Filed Dec. 8, 1958, Ser. No. 778,986
9 Claims. (Cl. 74—5.12)

This invention pertains to control apparatus and more specifically to gyroscopic apparatus. There exists at the present time a need for gyroscopes which are capable of being placed into an operating condition in an extremely short period of time. The present invention provides a gyroscope whose rotor member is capable of being brought from a stopped or standstill condition to an operating speed of several thousand revolutions per minute in a fraction of a second. In this invention a gyroscope rotor is adapted to be impelled by a stream of fluid (either liquid or gas) with the fluid supply being an integral part of the gyroscope. Means are also provided for caging the gyroscope about its displacement axis or axes until the gyroscope rotor has come up to speed at which time the gyroscope will be uncaged. The invention further provides a unique method of controlling the uncaging of the gyroscope so that the uncaging is accomplished only after the wheel has come up to speed, this timing function being related to a relatively small supply of fluid being used for both impelling the wheel and for uncaging the gyro. The uncaging mechanism is characterized by being effective to uncage the gyro only after being subjected to a relatively high pressure and then to a relatively lower pressure. By utilizing a relatively small supply of fluid for impelling the rotor of the gyroscope and for uncaging the gyroscope the pressure of the fluid, which is initially high, rapidly decreases as the fluid is used and accordingly within a short length of time has dropped to a point at which the uncaging mechanism will be actuated to uncage the gyroscope. It will be understood that prior to this time the bulk of the fluid under pressure would have been directed so as to impel the rotor up to speed.

It is an object of this invention to provide an improved gyroscopic apparatus.

Another object of this invention is to provide a gyroscope whose rotor member is initially caged about one or more displacement axes and which is rapidly brought up to speed, the rotor being uncaged automatically without the use of elaborate timing means when the rotor has come up to the desired speed.

It is a further object of the invention to provide an improved caging and uncaging mechanism for a gyroscope.

Another object of the invention is to provide a gyroscope having a rotor adapted to be impelled by compressed fluid wherein the fluid comes from a relatively small container integrally mounted on the gyroscope.

Another object of the invention is to provide a gyroscope comprising in part a rotor member adapted to be impelled by a compressed fluid together with means for receiving a small container such as a bottle of compressed fluid, the container receiving means being adapted to have charged containers inserted and expended containers extracted with a minimum of effort.

Another object of the invention is to provide a means of controlling the uncaking of a gyroscope comprising in part a rotor adapted to be impelled by compressed fluid so that the uncaging of the gyroscope automatically occurs upon the pressure of the fluid being applied to the rotor decreasing below a predetermined point.

These and other objects will become more apparent from a reading of the following specification and appended claims in connection with the accompanying drawings in which:

FIGURE 2 is an end view of the apparatus shown in FIGURE 1;

FIGURE 5 is a transverse cross-sectional view of the gyroscope showing in some detail the means for releasing a fluid pressure and also the uncaging mechanism.

Figure 4:
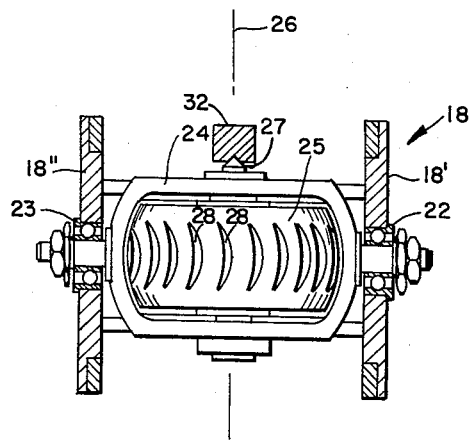
FIGURE 4 is a cross section of the inner gimbal and rotor as viewed along section lines 4—4 of FIGURE 3.

The gyroscope comprises in part a cup-shaped support or base or housing member 10 having an end wall 11 with a central aperture 12 therein. The open end of cup-shaped housing member 10 is closed off by a circular end piece member 13 adapted to fit into a suitable recess in member 10 and secured thereto by suitable means such as a plurality of machine screws 15. Circular end piece member 13 has a central circular aperture 14 therein in which is fitted the outer race of a suitable ball bearing 16. Also a suitable ball bearing unit 17 is fitted with the outer race thereof into the central aperture 12 of end wall 11 of the housing 10. The bearings 16 and 17 are coaxial with one another and are adapted to provide a rotational support for an outer gimbal member 18 having a gudgeon pin 19 adapted to fit into the inner race of bearing 16 and a hollow gudgeon portion 21 adapted to fit into the inner race of bearing 17. Bearing means 16, 17 thus define an outer displacement axis. As shown in FIGURE 4 the outer gimbal 18 has two side members 18' and 18" spaced apart and each having an aperture therein in which is mounted a suitable ball bearing unit 22 and 23 respectively, bearings 22 and 23 providing a rotational support for an inner gimbal member 24 having suitable gudgeon pin means or the like adapted to fit into the inner races of bearing means 22 and 23. It will be understood that the axis of rotation of inner gimbal member 24 relative to the outer gimbal 18 which is also defined as the inner or first displacement axis is substantially perpendicular to the outer or second displacement axis defined by bearings 16 and 17.

Figure 1:
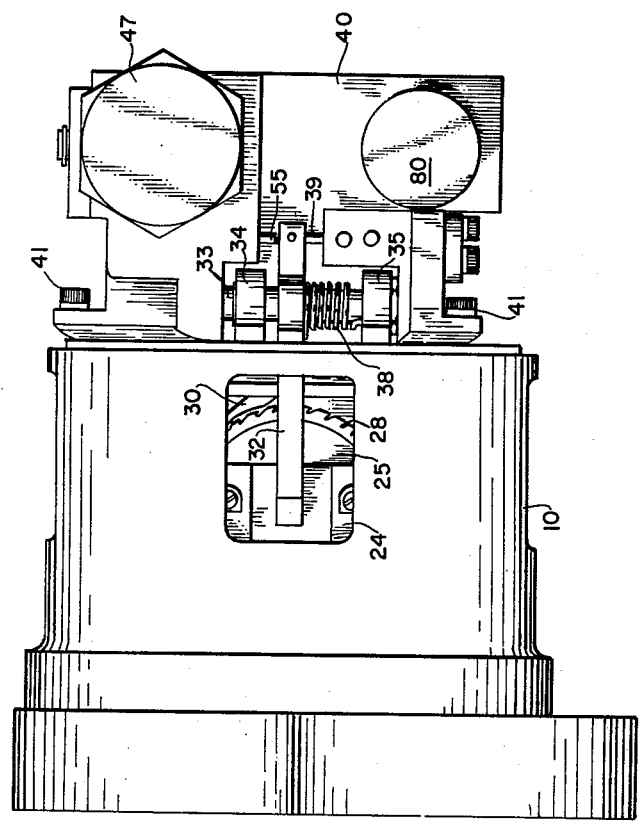
FIGURE 1 is a top view of a gyroscope embodying the principles of this invention.

The inner gimbal member 24 is a generally yoke shaped device adapted to support for rotation by suitable means not shown specifically a rotor member 25 for rotation about a spin reference axis 26. The inner gimbal 24 has a cone-shaped projection 27 aligned with the spin reference axis 26 extending from one side thereof. The rotor member 25 has on the periphery thereof a plurality of suitable indentations or bucket-like portions 28 adapted to provide a reaction surface on rotor 25 for a stream of fluid projected tangentially against rotor member 25 through a nozzle 30 shown clearly in FIGURE 1 and in FIGURE 3. The nozzle 30 is at one extremity of a tube-like member 31 concentrically positioned within the hollow gudgeon portion 21 of the outer gimbal 18. It will be understood that the tube 31 and the nozzle 30 on the end thereof is relatively stationary and that it does not restrict rotation of the outer gimbal relative to the housing 10.

Figure 3:
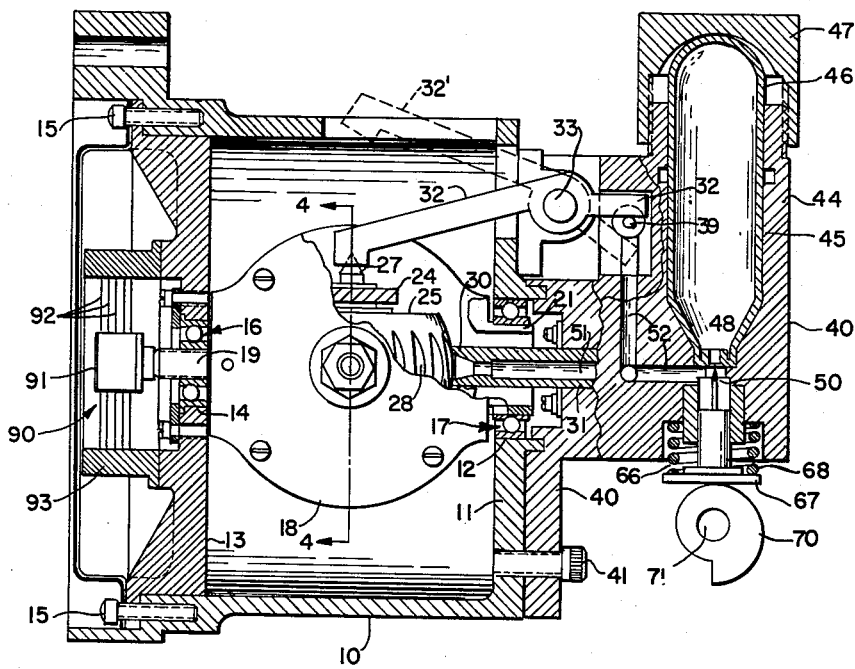
FIGURE 3 is a longitudinal cross-sectional view of the gyroscope.

The gyroscope is shown in the drawings in its caged position with the spin reference axis 26 in FIGURE 3 lying in the plane of the paper. The gyro is maintained in this caged position by a caging arm 32 pivotally mounted on a shaft 33 which in turn is journalled on a pair of supports 34 and 35 which are fastened by suitable means to the main housing 10. A suitable biasing means such as a helical coil spring 38 is positioned around shaft 33 and has one end secured to support 35 and the other end thereof is connected to the caging arm 32. The biasing means 38 is adapted to normally rotate the caging arm 32 in a clockwise sense as shown in FIGURE 3 from the full line position to the dotted line position 32'. Such rotation however is prevented normally from occurring by an axially movable pin member 39 mounted in an auxiliary housing 40 secured by suitable means such as machine screw 41 to the main housing 10.

The caging arm 32 is mounted as a first class lever for rotation about its pivotal axis defined by shaft 33. The left hand extremity of the caging arm 32 as shown in FIGURE 3 is provided with a suitable conical recess to coact with the conical surface 27 on the inner gimbal 24 and as shown in FIGURE 3 the caging arm 32 is holding or caging the gyroscope so that it is not free to rotate about either of its two displacement axes. As explained the right hand extremity of lever 32 normally abuts against the pin member 39 and accordingly is prevented from rotating clockwise as shown in FIGURE 3 to the dotted line position 32'. It will be understood that when there is no interference for the right hand portion of caging arm 32 as shown in FIGURE 3, then the spring means 38 is effective to rotate the caging arm to the dotted line position 32'.

The auxiliary housing 40 is characterized in part by having a portion 44 with a chamber 45 therein adapted to receive a small container of any suitable compressed fluid such as a bottle of compressed nitrogen or carbon dioxide 46. The bottle 46 of compressed fluid is adapted to fit into the cylindrical chamber or recess 45 of auxiliary housing 40 and is adapted to be maintained fixed in position by a removable end cap member 47. The bottle 46 of compressed fluid is characterized by being sealed or closed off at one end by an end wall 48. The auxiliary housing 40 is provided with an internal manifold chamber identified by reference numeral 50 and located adjacent to the closed off portion 48 of a bottle 46 in chamber 45. A pair of ports or fluid passageways leading from manifold 50 to the gyro rotor 25 and to the uncaging mechanism are provided. The first port 51 is in communication with the tube 31 which terminates in nozzle 30 and the second port 52 extends laterally and then upwardly as shown in FIGURES 3 and 5 terminating in a cylinder portion 53. A small piston member 54 is positioned in cylinder 53 and as shown in FIGURE 5 is characterized by having an extension or rod portion 55 the end of which is adapted to abut against the right hand extremity of pin 39 as shown in FIGURE 5. The displacement axis of piston 54 is aligned with the displacement axis of the pin 39. The piston 54 is limited in its travel to the right as shown in FIGURE 5 by an adjustable stop means such as screw 56 and the piston 54 is normally biased to this position by a suitable biasing means shown as a coil spring 57 positioned around the pin portion 55 of the piston. The piston member 54 is adapted to be displaced to the left as shown in FIGURE 5 upon a predetermined pressure being applied to the face thereof through the port 52, overcoming the biasing restraint of spring 57 and causing the pin member 39 to be displaced axially to the left as shown in FIGURE 5. Pin member 39 has a central portion 42 of increased diameter with a pair of circumferential grooves 42' and 42" therein adapted to coact with a spring biased ball 60 in a ball and detent manner to maintain pin 39 in one of two positions, the first being as shown in FIGURE 5 with ball 60 engaging groove 42' and the second being when it is displaced to the left as shown in FIGURE 5 by the action of piston 54 so that ball 60 is in groove 42".

Means are provided for releasing the fluid under pressure within the bottle 46. A variety of ways for accomplishing this may be provided, one specific method being shown herein comprising a pin member 62 normally positioned so that the tip thereof is in the manifold area 50 and adapted under certain conditions to be moved upwardly as shown in FIGURE 5 so as to pierce the closed off portion 48 of the bottle 46. Pin 62 is mounted on the end of a cam follower assembly 65 including a cylindrical portion 66 adapted to snugly fit into a suitable recess of the auxiliary housing 40 which is adjacent to the manifold 50. The other end of the assembly 65 has an enlarged head portion 67. A coil compression spring 68 is positioned between portion 67 and the auxiliary housing 40 and normally biases the assembly 65 in such a direction that the pin 62 is displaced away from the closed off portion 48 of the bottle 46. Portion 67 of the assembly 65 serves as a cam follower and is adapted to coact with a cam member 70 which is integrally mounted on a shaft 71 which in turn is supported for rotative movement relative to auxiliary housing 40 by suitable bracket means 72, 73 and 74 which are integral with housing 40. The cam 70 serves as a means to limit the outward travel of the cam follower 67 and it will be understood that as the shaft 71 and the cam 70 mounted thereon rotates about the axis defined by the supports 72, 73 and 74 that the pin 62 mounted on the cam follower assembly 65 will be moved upwardly as shown in FIGURES 3 and 5 so that the pin 62 pierces the wall 48 of the bottle 46. The means for rotating shaft 71 include a coil spring 75 having one end fixed to the support 73 and the other end attached to the cam 70. Attached to one end of the shaft 71 is a nut member 76 which provides a convenient means in combination with a torque applying means such as a wrench of initially winding up the spring 75. Once the shaft 71 has been rotated so as to wind up the spring 75 it is locked in the position shown in the drawings by suitable means such as a lever arm 77 integrally attached to the shaft 71 being obstructed by a latch member 78. The latch member 78 is part of a solenoid mechanism 80 adapted when energized to displace the latch 78 upwardly as shown in FIGURE 5 so as to release lever 77 and permit shaft 71 to rotate counter-clockwise as shown in FIGURE 3 so as to displace the cam follower assembly 65 and pin 62 upwardly to pierce wall 48 of bottle 46.

*Operation*

As indicated, the device in the standby condition has a full bottle of compressed fluid 46 mounted within the chamber 45 and locked in place by the cap 47. Prior to this time the shaft 71 has been wound a suitable amount so as to provide the desired amount of spring tension in the cam driving means 75 and the latch 78 associated with the solenoid mechanism 80 is in position so as to serve as an obstruction for the lever arm 77 attached to the shaft 71 thus preventing the shaft 71 from rotating. Also at this time the uncaging pin 39 is in position as shown in FIGURE 5 thus preventing the caging arm 32 from being rotated under the influence of its biasing spring 38 to the dotted line position 32'. Also the left extremity of the caging arm 32 as shown in FIGURE 3 is in engagement with the conical projection 27 on the inner gimbal 24 thus locking the gyro from rotation about either of its two displacement axes defined by bearings 22—23 and bearings 16—17 respectively.

When it is desired to actuate the gyroscope a suitable command signal will be applied to the solenoid mechanism 80 thus causing the latch 78 thereon to be displaced upwardly as shown in FIGURES 2 and 5 which thus releases the lever arm 77 attached to shaft 71. This permits the shaft 71 to rotate counter-clockwise as shown in FIGURE 3 under the influence of its biasing spring 75 and the cam 70 thereon will then coact with the cam follower 67 on the cam follower mechanism 65 so as to quickly move upwardly the cam follower mechanism including the pin 62 which pierces the closed off wall 48 on the bottle 46. The cam 70 continues to rotate under the driving force of spring 75. As soon as the high point on the cam is passed then the spring means 68 associated with the cam follower mechanism 65 will be free to displace the cam follower mechanism outwardly or downwardly as shown in FIGURES 2, 3, and 5 so as to extract the pin 62 out of the end wall 48 of bottle 46 and then permit the fluid under pressure to flow into the manifold zone 50. Since the cylindrical portion 66 of the cam follower mechanism fits snugly into its mounting the fluid under pressure cannot escape out around the cam follower assembly. The only flow paths for the fluid under pressure are from the manifold zone 50 out through the ports 51 and 52. The fluid under pressure in port 52 immediately acts on the piston 54 and will be at a pressure sufficiently high so as to overcome the restraint of spring 57 normally biasing the piston 54 and causes the piston to be displaced to the left as shown in FIGURE 5, the rod portion 55 of the piston displacing the caging pin 39 to the position where ball 60 is in groove or detent 42″. This has no immediate effect on the caging arm 32 since the pin portion 55 of the piston 54 also prevents the caging arm 32 from rotating. The piston 54 will be maintained in its actuated position as long as a predetermined amount of pressure exists on the port 52. At the same time that the piston is being displaced to the left as shown in FIGURE 5 the bulk of the fluid under pressure from bottle 46 is flowing through the port 51 in communication with the nozzle 30 and is directed tangentially against the rotor 25 and reacts with the buckets 28 on the periphery of the rotor. The rotor 25 thus has rotation imparted to it for rotation about its spin reference axis 26 and is brought up to the desired operating speed in a very short period of time. For example, in a gyro of this type having a bottle of compressed carbon dioxide as a propellant, the rotor is accelerated from a stopped condition to an operating speed of 6,000 r.p.m. in 100 milliseconds. When the pressure in port 52, or more specifically, when the pressure acting on piston 54 falls below a predetermined point then the biasing spring 57 will displace the piston 54 to its right hand limit of travel as shown in FIGURE 5 at which point the caging arm 32 will be released and permitted to rotate clockwise about its pivotal axis 33 as shown in FIGURE 3 under the influence of its biasing spring 38. It will be understood that the pin member 39 will be maintained in its actuated position since there is no means for causing it to return with the piston 54. To the contrary the ball and detent arrangement including ball 60 coacting with groove 42″ assures that the pin 39 will stay locked in its left hand extremity of travel as shown in FIGURE 5 thus assuring that the caging arm 32 will be free to rotate about its pivotal point to uncage the gyro.

The whole sequence of operation (rotor impelling and gimbal uncaging) takes place in an exceedingly short period of time. As indicated the rotor speed goes from zero to several thousand revolutions per minute in a fraction of a second. The uncaging of the gimbal system for the rotor 25 is automatically accomplished by the mechanism described in another fraction of a second after the rotor gets up to speed. It is important that the gyro be caged until the rotor has reached a predetermined rate of rotation. The present invention provides a unique controlling of the uncaging of the gyro so that the uncaging only occurs after the rotor has come up to speed. This is by virtue of the fact that the caging arm 32 is not released until after the pressure from the bottle 46 has fallen to a predetermined point, this being indicative of the fact that the fluid under pressure has done its work in bringing the rotor up to speed.

It will be understood that when the fluid in bottle 46 is first released the pressure of the fluid applied to piston 54 and to nozzle 30 is at a maximum. As the fluid flows out through nozzle 30 against rotor 25, the rotor begins to rotate. The pressure of the fluid decreases from its maximum point as the fluid is discharged, the mass rate of flow of the fluid being a function of the initial pressure and volume of the fluid and also a function of the restriction to fluid flow including the size of passage 51 and the size of the orifice of nozzle 30.

There are several variables which affect the timing of the uncaging of the gyro. One factor is the mass rate of flow of the fluid described above which in turn affects the pressure applied to the piston 54 at any time subsequent to the release of the fluid. The other variables are the area of piston 54 acted on by the fluid and the magnitude of biasing action by spring means 57 acting on piston 54. The mass rate of flow can be very accurately predetermined by knowing the amount of fluid in the bottle 46 and the size of passage 51 and nozzle 30. The amount of fluid in the individual bottles in turn can be accurately determined by weighing the bottles. It will therefore be understood that by suitable choice of the different variables involved in the uncaging means, within a certain range of limits, any desired uncaging time may be selected and further that the accuracy of the timing of the uncaging will be very good. Generally, the design of the uncaging means will be so that the gimbals are not uncaged until after the rotor has been brought up to speed.

It may be desired in certain applications to provide additional means for maintaining the rotation of rotor 25. As shown the rotor 25 will initially be impelled to a very high rate of rotation and will then coast on its bearings. For some applications such as a short term stable reference this is sufficient. In other applications additional means not shown may be provided for maintaining the desired rate of rotation.

It will be understood that the gyroscopic mechanism shown can be re-used merely by caging the gimbal system and locking it in place by displacing the pin 39 to its right hand extremity of travel as shown in FIGURE 5 and by putting a new bottle 46 of compressed fluid in the chamber 45 having first recocked the shaft 71.

Suitable means may be provided for measuring relative displacement within the gimbals 18 and 24 and between the gimbal 18 and the housing 10. Such a means 90 is shown in FIGURE 3 for measuring displacement of the outer gimbal 18 relative to the housing 10, pickoff means 90 including a member 91 attached to the grudgeon pin 19 and a plurality of wires 92 attached to a hub portion 93 integral with hte circular end piece 13 of the housing 10.

While we have shown and described specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What we claim is:

1. In a gyroscope: a base; a gimbal rotatably mounted on said base for rotation about a first axis; a rotor member rotatably mounted on said gimbal for rotation about a spin axis perpendicular to said first axis; caging means normally caging said gimbal against rotation about said first axis relative to said base; means for disabling said caging means; means for providing a relatively small supply of compressed fluid which initially has a substantially high pressure; and means for connecting said fluid providing means to said rotor and to said disabling means, said disabling means being characterized by being effective only after being subjected to a substantially high pressure and then to a substantially lower pressure.

2. In a gyroscope: a support; a gimbal rotatably mounted on said support for rotation about a first axis; a rotor member rotatably mounted on said gimbal for rotation about a spin axis perpendicular to said first axis; caging means normally caging said gimbal against rotation about said first axis relative to said support; means for dsabling said caging means; means for providing a relatively small supply of compressed fluid which initially has a substantially high pressure; and means for connecting said fluid providing means to said disabling means, said disabling means being characterized by being effective only after being subjected to a substantially high pressure and then to a substantially lower pressure.

3. In a gyroscope: a housing; a gimbal rotatably mounted within said housing for rotation about a first axis; a rotor member rotatably mounted on said gimbal for rotation about a spin axis perpendicular to said first axis; caging means normally caging said gimbal; means contained within said housing for providing a relatively small supply of compressed fluid which initially has a substantially high pressure; means for connecting said fluid providing means to said rotor; and means for disabling said caging means subsequent to said rotor member having rotation imparted to it.

4. In a gyroscope: a support; a gimbal rotatably mounted on said support for rotation about a first axis; a rotor member rotatably mounted on said gimbal for rotation about a spin axis; caging means normally preventing said gimbal from rotating about said first axis relative to said support; means for disabling said caging means; means on said support for providing a relatively small supply of compressed fluid which initially has a substantially high pressure; and means for connecting said fluid providing means to said rotor and to said disabling means, said disabling means being characterized by being effective only after being subjected to a substantially high pressure and then to a substantially lower pressure.

5. In a gyroscope: a base; a first gimbal rotatably mounted on said base for rotation about a first axis; a second gimbal rotatably mounted on said first gimbal for rotation about a second axis perpendicular to said first axis; a rotor member rotatably mounted on said second gimbal for rotation about a spin axis perpendicular to said second axis; a jet pipe mounted on said base and having a nozzle at one extremity thereof positioned adjacent to the periphery of said rotor member when said gimbal members are in a predetermined position relative to said base; a caging arm pivotally mounted on said base and having means on one end thereof adapted to coact with said second gimbal when said arm is in a first position to hold said gimbals in said predetermined position; first spring means coacting with said caging arm and tending to rotate said caging arm from said first position to a second position whereat said gimbals are released by said means on said arm so as to be free to rotate about said first and second axes; axially movable locking pin means mounted on said base and normally positioned so as to prevent said caging arm from being displaced from said first position by said first spring means; an axially movable piston member positioned adjacent to and aligned with said locking pin means; second spring means adapted to bias said piston to a first position, said piston being adapted when a predetermined fluid pressure is applied thereto to be displaced against the restraint of said second spring means from said first position to a second position, said locking pin means being disabled from locking said caging arm by said piston being displaced to said second position, and said piston means being effective in said second position to maintain the holding of said caging arm in said first position thereof; a relatively small container of compressed fluid mounted on said base; a first passageway connecting said container to said jet pipe; a second passageway connecting said container to said piston; and controllable means for releasing the fluid in said container so that it flows through said passageways to said nozzle and to said piston, the fluid in said first passageway being directed by said nozzle tangentially against the periphery of said rotor to cause said rotor to rotate about said spin axis and the fluid in said second passageway initially being at a pressure sufficiently high to displace said piston to said second position, said piston being returned to said first position by said second spring means when said fluid pressure decreases below a predetermined point to release said caging arm and permit said first spring means to rotate said caging arm to said second position.

6. In a gyroscope: a base; a first gimbal rotatably mounted on said base for rotation about a first axis; a second gimbal rotatably mounted on said first gimbal for rotation about a second axis perpendicular to said first axis; a rotor member rotatably mounted on said second gimbal for rotation about a spin axis perpendicular to said second axis; a jet pipe mounted on said base and having a nozzle at one extremity thereof positioned adjacent to the periphery of said rotor member when said gimbal members are in a predetermined position relative to said base; a caging arm pivotally mounted on said base and having means on one end thereof adapted to coact with said second gimbal when said arm is in a first position to hold said gimbals in said predetermined position; first spring means coacting with said caging arm and tending to rotate said caging arm from said first position to a second position whereat said gimbals are released by said means on said arm so as to be free to rotate relative to said base about said first and second axes; axially movable locking pin means mounted on said base and normally positioned so as to prevent said caging arm from being displaced from said first position by said first spring means; a piston member positioned adjacent to and aligned with said locking pin means; second spring means adapted to bias said piston to a first position, said piston being adapted when a predetermined fluid pressure is applied thereto to be displaced against the restraint of said second spring means from said first position to a second position, said locking pin means being disabled from locking said caging arm by said piston being displaced to said second position, and said piston means being effective in said second position to maintain the holding of said caging arm in said first position thereof; means on said base for receiving a relatively small container of compressed fluid; a first passageway connecting said receiving means to said jet pipe; a second passageway connecting said receiving means to said piston; and controllable means for releasing the fluid in a container in said receiving means so that it flows through said passageways to said nozzle and to said piston, the fluid in said first passageway being directed by said nozzle tangentially against the periphery of said rotor to cause said rotor to rotate about said spin axis and the fluid in said second passageway initially being at a pressure sufficiently high to displace said piston to said second position, said piston being returned to said first position by said second spring means when said fluid pressure decreases below a predetermined point to release said caging arm and permit said first spring means to rotate said caging arm to said second position.

7. In a gyroscope: a base; a gimbal rotatably mounted on said base for rotation about a first axis; a rotor member rotatably mounted on said gimbal for rotation about a spin axis perpendicular to said first axis; a nozzle positioned adjacent to said rotor member; caging means movably mounted on said base and having means adapted to coact with said gimbal when said caging means is in a first position to prevent said gimbal from rotating relative to said base; first biasing means coacting with said caging means and tending to move said caging means from said first position to a second position whereat said gimbal is released to rotate relative to said base about said first axis; locking means movably mounted on said base and normally positioned to prevent said caging means from being displaced from said first position by said first biasing means; pressure responsive means positioned adjacent to said locking means; biasing means coacting with said pressure responsive means to hold said pressure responsive means in a first position, said pressure responsive means being adapted when a predetermined fluid pressure is applied thereto to be displaced from said first position to a second position, said locking means being disabled from locking said caging means by said pressure responsive means being displaced to said second position, and said pressure responsive means being effective in said second position to maintain the holding of said caging means in said first position thereof; means for providing a relatively small supply of compressed fluid to said nozzle and to said pressure responsive means, the fluid being directed by said nozzle against said rotor to cause said rotor to rotate about said spin axis and the fluid applied to said pressure responsive means initially being at a pressure sufficiently high to displace said pressure responsive means to said second position, said pressure responsive mean being returned to said first position by said biasing means thereof when said fluid pressure decreases below a predetermined point to release said caging means so as to permit said first biasing means to rotate said caging means to said second position.

8. In a gyroscope: a base, a gimbal rotatably mounted on said base for rotation about a first axis; a rotor member rotatably mounted on said gimbal for rotation about a spin axis perpendicular to said first axis; caging means movably mounted on said base and having means adapted to coact with said gimbal when said caging means is in a first position to prevent said gimbal from rotating relative to said base; first biasing means coacting with said caging means and tending to move said caging means from said first position to a second position whereat said gimbal is released to rotate relative to said base about said first axis; locking means movably mounted on said base and adapted to prevent said caging means from being displaced from said first position by said first biasing means; pressure responsive means positioned adjacent to said locking means; biasing means coacting with said pressure responsive means to hold said pressure responsive means in a first position; said pressure responsive means being adapted when a predetermined fluid pressure is applied thereto to be displaced from said first position to a second position, said locking means being disabled from locking said caging means by said pressure responsive means being displaced to said second position, and said pressure responsive means being effective in said second position to maintain the holding of said caging means in said first position thereof; means for providing fluid under pressure to said pressure responsive means, the fluid connected to said pressure responsive means initially being at a pressure sufficient to displace said pressure responsive means to said second position, said pressure responsive means being returned to said first position by said biasing means thereof when said fluid pressure decreases below a predetermined point to release said caging means so as to permit said first biasing means to rotate said caging means to said second position.

9. In a gyroscope: a support; a gimbal rotatably mounted on said support for rotation about a first axis a rotor member rotatably mounted on said gimbal for rotation about a spin axis; caging means normally preventing said gimbal from rotating about said first axis relative to said support; means for disabling said caging means; on said support for providing a relatively small supply of high pressure fluid; means for connecting said fluid providing means to said rotor and to said disabling means, said disabling means being characterized by being effective only after being subjected to a substantially high pressure and then a substantially lower pressure.

References Cited in the file of this patent

UNITED STATES PATENTS

| | | |
|---|---|---|
| 741,683 | Leavitt | Oct. 20, 1903 |
| 768,291 | Leavitt | Aug. 23, 1904 |
| 1,077,344 | Hennig | Nov. 4, 1913 |
| 2,206,723 | Graham et al. | July 2, 1940 |
| 2,415,899 | Meyer et al. | Feb. 18, 1947 |
| 2,852,208 | Schlesman | Sept. 16, 1958 |

FOREIGN PATENTS

| | | |
|---|---|---|
| 581,737 | Great Britain | Oct. 23, 1946 |